United States Patent
Hong et al.

(10) Patent No.: US 12,008,507 B2
(45) Date of Patent: Jun. 11, 2024

(54) SYSTEMS AND METHODS FOR HANDLING PACKAGES TRANSPORTED IN A DELIVERY VEHICLE

(71) Applicant: Ford Global Technologies, LLC, Dearborn, MI (US)

(72) Inventors: Young-Chae Hong, Dearborn, MI (US); Shan Chy Chueh, Ypsilanti, MI (US); John Randolph Vincent, Livonia, MI (US); Steven Stark, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 109 days.

(21) Appl. No.: 17/394,288

(22) Filed: Aug. 4, 2021

(65) Prior Publication Data

US 2023/0039236 A1 Feb. 9, 2023

(51) Int. Cl.
| | | |
|---|---|---|
| *G06Q 10/083* | (2024.01) | |
| *B65B 35/54* | (2006.01) | |
| *B65B 65/00* | (2006.01) | |
| *B65B 65/02* | (2006.01) | |

(52) U.S. Cl.
CPC ........... *G06Q 10/083* (2013.01); *B65B 35/54* (2013.01); *B65B 65/003* (2013.01); *B65B 65/02* (2013.01)

(58) Field of Classification Search
CPC .............................. B65B 35/54; B65B 65/003
See application file for complete search history.

(56) References Cited

U.S. PATENT DOCUMENTS

| | | | |
|---|---|---|---|
| 7,118,034 B2 | 10/2006 | Baldassari et al. | |
| 10,643,171 B1 * | 5/2020 | Zhang | G06Q 10/08355 |
| 10,867,275 B1 * | 12/2020 | Dholakia | G06V 20/52 |
| 2017/0140327 A1 | 5/2017 | Lindbo | |
| 2017/0262790 A1 * | 9/2017 | Khasis | G08G 1/012 |

(Continued)

OTHER PUBLICATIONS

Loginext, "Capacity Planning and Auto Allocation! Increase Logistics Management Efficiency Now!", Loginext, Mar. 19, 2018, pp. 1-7. (Year: 2018).*

(Continued)

*Primary Examiner* — Omar Zeroual
*Assistant Examiner* — Duane N. Moore
(74) *Attorney, Agent, or Firm* — Emily Drake; Eversheds Sutherland (US) LLP

(57) ABSTRACT

Exemplary embodiments described in this disclosure generally pertain to systems and methods to handle packages transported in a delivery vehicle. In an example embodiment, a computer that is provided in a vehicle receives a command related to delivery of a package. The command may be associated, for example, with rerouting of the vehicle due to various reasons such as, for example, due to a change in a delivery schedule and/or a delivery priority. The computer may respond to the command by operating an unmanned package moving apparatus to move the package from one location in a cargo area of the vehicle to another location in the cargo area while the vehicle is in motion and prior to the vehicle reaching a delivery destination for the package. In an example implementation, the unmanned package moving apparatus includes a bed of rollers that are operated by servomotors under control of the computer.

14 Claims, 8 Drawing Sheets

(56) References Cited

U.S. PATENT DOCUMENTS

| | | | |
|---|---|---|---|
| 2018/0240181 A1* | 8/2018 | Lopez | G06Q 10/00 |
| 2020/0026291 A1* | 1/2020 | Kim | G05D 1/0088 |
| 2020/0231185 A1* | 7/2020 | Shiu | G06Q 10/0833 |
| 2020/0233438 A1* | 7/2020 | Dinh | G05D 1/104 |
| 2020/0254490 A1 | 8/2020 | Lundahl et al. | |
| 2020/0354171 A1* | 11/2020 | Vincent | B65G 67/24 |
| 2021/0065242 A1* | 3/2021 | Ta | G06Q 30/0267 |
| 2021/0102817 A1* | 4/2021 | Kim | G01C 21/3407 |
| 2021/0166192 A1* | 6/2021 | Balva | G06Q 50/40 |

OTHER PUBLICATIONS

Loginext, "Capacity Planning and Auto Allocation! Increase Logistics Management Efficiency Now!", Loginext, Mar. 19, 2018.

* cited by examiner

SYSTEMS AND METHODS FOR HANDLING PACKAGES TRANSPORTED IN A DELIVERY VEHICLE

BACKGROUND

Delivery services for delivering various types of products have been around for many years. Most of these delivery services use drivers for driving delivery vehicles and have attempted to maximize profit margins by optimizing various operating parameters such as inventory management, delivery routes, delivery times, driving distances, and vehicle fuel consumption. The delivery services have also attempted to minimize time spent by drivers when driving along a delivery route and when delivering packages at customer locations. However, certain operations that may benefit from additional scrutiny and optimization may have been left unidentified and unaddressed at this time.

Typically, a driver of a delivery vehicle places packages inside the delivery vehicle in some sort of order that he/she personally prefers and then uses his/her memory to retrieve the right package at each delivery destination. Some of the more experienced drivers may become relatively efficient at carrying out deliveries in this manner. However, some less experienced drivers, as well as relatively disorganized drivers, may spend too much time in identifying, retrieving, and delivering the packages at the various destinations. These and other shortcomings exist in the packing and emptying of delivery vehicles.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
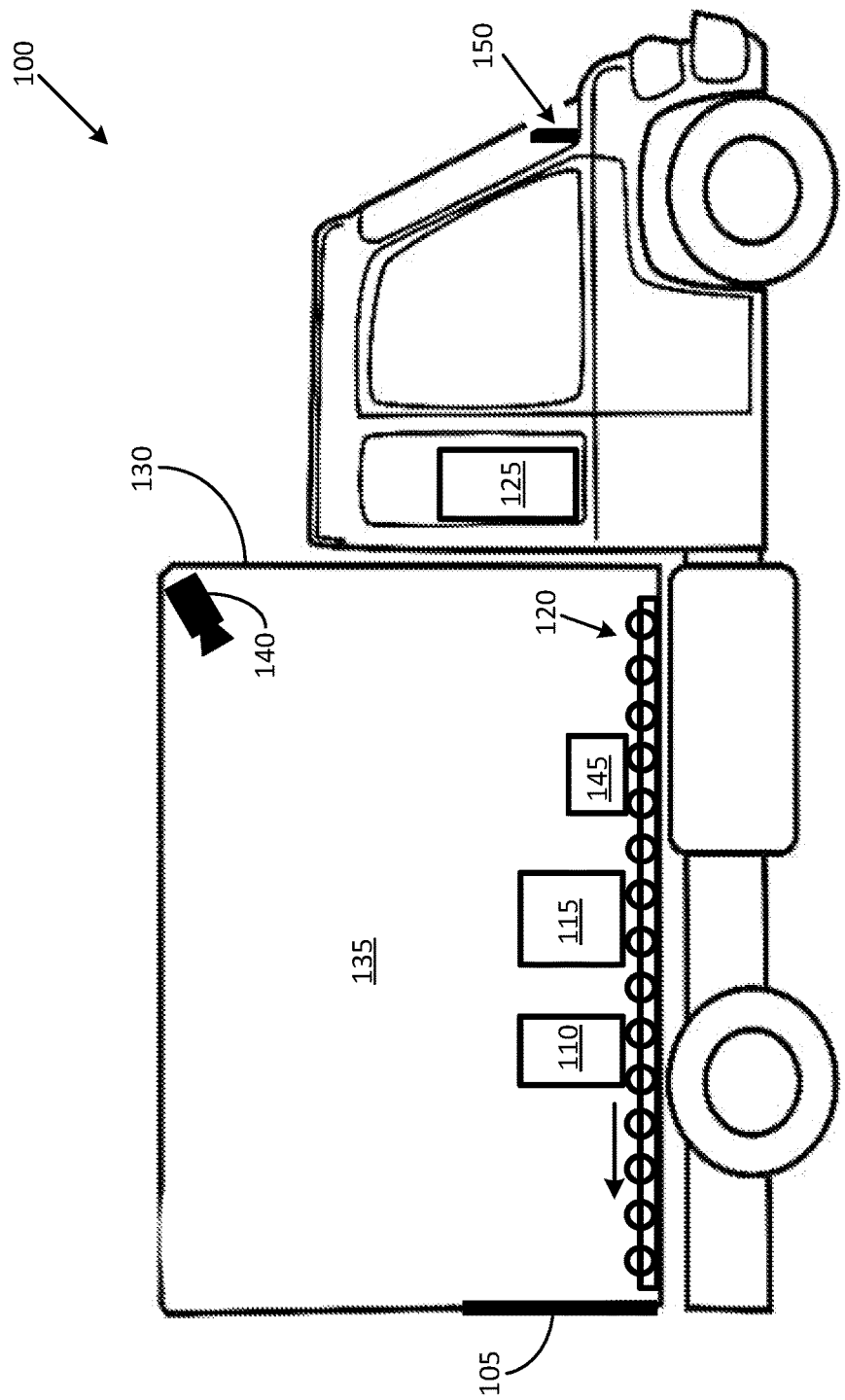
FIG. 1 shows a cut-away view of a delivery vehicle incorporating a first example embodiment of an automated package handling system in accordance with the disclosure.

In terms of a general overview, certain embodiments described in this disclosure are directed to systems and methods related to handling of packages transported in a delivery vehicle. In an example embodiment, a computer that is provided in a vehicle receives a command related to delivery of a package. The command may be associated, for example, with rerouting of the vehicle due to various reasons such as, for example, due to a change in a delivery schedule and/or a delivery priority. The computer may respond to the command by operating an unmanned package moving apparatus to move the package from one location in a cargo area of the vehicle to another location in the cargo area while the vehicle is in motion and prior to the vehicle reaching a delivery destination for the package. In an example implementation, the unmanned package moving apparatus includes a bed of rollers that are operated by servomotors under control of the computer.

In another example embodiment, a computer that is provided in a vehicle identifies a set of rollers in a bed of rollers provided in a cargo area of the vehicle. The set of rollers are activatable by servomotors, under control of the computer, so as to move packages along a movement path in the cargo area. The computer further identifies a package placement configuration for a set of packages based on precluding placement of any of the set of packages on the movement path. The computer then operates the first set of rollers to move the set of packages into a set of storage locations in the cargo area in conformance with the package placement configuration.

Illustrative Embodiments

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. For example, any of the functionality described with respect to a particular device or component may be performed by another device or component. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words, terms, and phrases are used herein solely for convenience and such words and terms should be interpreted as referring to various objects and actions that are generally understood in various forms and equivalencies by persons of ordinary skill in the art. For example, the word "vehicle" as used herein encompasses various types of automobiles such as vans and trucks that are driven by human operators and automobiles that are autonomously operated, and also encompasses other modes of transporting packages such as trailers that are detachably attached to vehicles. The phrase "autonomous vehicles" refers to automobiles that may be alternatively known by various other labels such as self-driving vehicles and robotic vehicles. The word "item" and the word "package" may be used interchangeably in his disclosure. It must be understood that both words generally refer to various types of objects transported in a delivery vehicle, such as, for example, parcels, shipping boxes, consumable items (pizza, groceries, etc.), containers, unpackaged objects, and freight goods. The word "example" as used herein is intended to be non-exclusionary and non-limiting in nature.

FIG. 1 shows a cut-away view of a delivery vehicle 130 incorporating an example embodiment of an automated package handling system 100 in accordance with the disclosure. The delivery vehicle 130 can be an autonomous vehicle in one example implementation and a driver-operated vehicle in another. The automated package handling system 100 includes an unmanned package moving apparatus located in a cargo area 135 of the delivery vehicle 130. The unmanned package moving apparatus may be implemented in various forms and can include elements such as, for example, a robotic platform, a robotic arm, a humanoid, a wheeled robot, a rail, a track, a conveyor belt, and/or a moving platform.

In the illustrated example embodiment, the unmanned package moving apparatus is implemented in the form of a bed of rollers 120. Some, or all, of the rollers in the bed of rollers 120 may be coupled to servomotors (not shown) that can be activated via control signals from a computer 125, in order to rotate each roller in various directions.

In an example implementation, the computer 125 may provide a first type of control signal to a servomotor to make a roller rotate in a first direction and a second type of control signal to make the roller rotate in a second, or opposite direction. Providing the first type of control signal to the servomotor may involve applying a voltage of a first polarity to a terminal of the servomotor in order to make the roller rotate, for example, in a clockwise direction. Providing the second type of signal to the servomotor may involve applying a voltage of an opposite polarity to the terminal of the servomotor in order to make the roller rotate, for example, in a counter-clockwise direction.

In another example implementation, the computer 125 may provide a first type of control signal to move an axle of a roller in order to orient the roller in a first direction and a second type of control signal to orient the roller in a second direction. The second direction may be opposite to the first direction in one case and may be angular with respect to the first direction (45 degrees, for example) in another case.

The delivery vehicle 130 may include one or more exterior-facing doors at various locations such as, for example, an exterior-facing door 105 located in a rear portion of the delivery vehicle 130. Another exterior-facing door may be located, for example, on a side portion of the delivery vehicle 130 to allow an individual standing on a sidewalk to reach into the cargo area 135 of the delivery vehicle 130 for retrieving a package. In an example implementation, the delivery vehicle 130 may be a small vehicle and the layout of the cargo area 135 may preclude human presence. As such, an individual may be unable to climb into the cargo area 135 to retrieve a package.

In an example package delivery procedure in accordance with the disclosure, the computer 125 may cooperate with a global positioning system (GPS) device that can be a part of a navigation system 150 to determine a location of the vehicle, such as to determine that the delivery vehicle 130 has arrived at a package delivery location, which may be one of several delivery locations on a delivery route. The computer 125 may then identify a location of the item 110 upon the bed of rollers 120. In an example procedure to identify the location of the item 110, the computer 125 may evaluate images provided by a camera 140 located in the cargo area 135. The item 110 may be identified, for example, by reading a barcode label affixed to the item 110 and/or based on location coordinates of the item 110 upon the bed of rollers 120. In one case, the location coordinates may be determined by using a template of the bed of rollers 120 stored in a database of the computer 125.

After identifying the location of the item 110, the computer 125 provides control signals to a set of rollers in the bed of rollers 120 to move the item 110 from the location to a spot close to the exterior-facing door 105. In this example implementation, the computer 125 may activate the set of rollers after the delivery vehicle 130 has arrived at the package delivery location. In another example implementation, the computer 125 may activate the set of rollers to move the item 110 to a spot close to the exterior-facing door 105 prior to the delivery vehicle 130 arriving at the package delivery address (either during a previous stop, or when the delivery vehicle 130 is in transit to the package delivery location), thereby minimizing the amount of time spent at the package delivery location.

Upon arriving at the package delivery location, the computer 125 may ensure that the delivery vehicle 130 is in a parked condition and then open the exterior-facing door 105 by transmitting a control signal to a servomotor that is coupled to the exterior-facing door 105. An individual, such as a customer or a driver of the delivery vehicle 130, for example, can then reach into the cargo area 135 through the exterior-facing door 105 to retrieve the item 110.

In some cases, particularly when the delivery vehicle 130 is an autonomous vehicle, additional structures such as, for example, movable and/or fixed panels, may be provided in the cargo area 135 of the delivery vehicle 130. The panels may be controlled by the computer 125 and configured to prevent the individual from having access to items not intended for the individual, such as a package 115 and a package 145 that are intended for delivery to other recipients. Additional details pertaining to package unloading procedures in accordance with the disclosure are provided below.

In an example package loading procedure in accordance with the disclosure, that may be executed prior to the delivery vehicle 130 setting out on a delivery route, the computer 125 may identify one or more physical characteristics of a package such as, for example, a weight, a volume, and/or a shape of the item 110. The computer 125 then uses the physical characteristics of the item 110 to identify an efficient storage location for the item 110 as well as other items to be placed in the cargo area 135 of the delivery vehicle 130. The storage location may be further identified based on other factors such as, for example, a delivery schedule and/or a delivery priority. The computer 125 may further identify a movement path for the item 110 upon the bed of rollers 120 and activate a set of rollers that are located in the movement path to automatically move the item 110 from the exterior-facing door 105 to the storage location. Additional details pertaining to package loading procedures in accordance with the disclosure are provided below.

Figure 2:
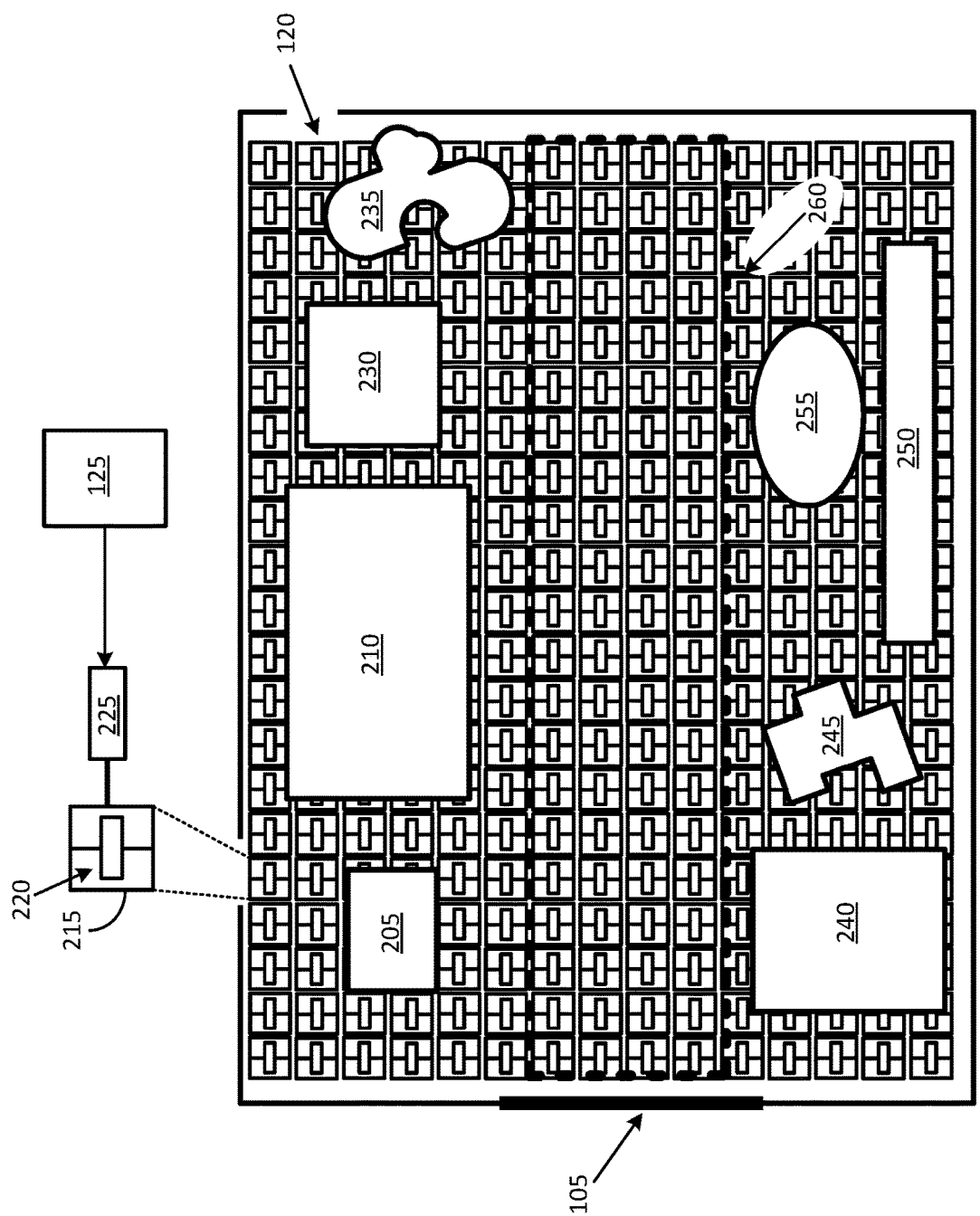
FIG. 2 shows a first example bed of rollers that may be a part of a delivery vehicle in accordance with the disclosure.

FIG. 2 shows the example bed of rollers 120 that may be a part of the delivery vehicle 130 in accordance with the disclosure. In this example embodiment, the bed of rollers 120 has a rectangular shape and the rollers are arranged in a matrix configuration. However, in other embodiments, the bed of rollers 120 can have other shapes and the rollers may be arranged in other configurations.

An expanded view of one of the rollers in the bed of rollers 120 includes a roller element 220 mounted on a base 215. The base 215 may be coupled to a servomotor 225 in an arrangement that allows the servomotor 225 to rotate the roller element 220. In a first example implementation, the roller element 220 may be a wheel mounted on an axial. The servomotor 225 can rotate the wheel in a clockwise direction when the computer 125 provides a first control signal to the servomotor 225. An item that is placed upon the bed of rollers 120 and in contact with at least the roller element 220 can be moved in a first direction when the roller element 220 rotates in the clockwise direction. The servomotor 225 can rotate the wheel in a counter-clockwise direction when the computer 125 provides a second control signal to the servomotor 225. The item that is placed upon the bed of rollers 120 and in contact with at least the roller element 220 can be moved in a second direction that is opposite to the first direction, when the roller element 220 rotates in the counter-clockwise direction. In a variation of this example implementation, the base 215 may include an axle that is pivotable such that the wheel can be aligned in various directions or the axle may be mounted in the base 215 with an angular orientation. This arrangement, which allows various items to be moved in various directions upon the bed of rollers 120, is described below with reference to another figure.

In a second example implementation, the roller element 220 may be a rollerball and the base 215 is a mounting fixture that allows the rollerball to rotate in various directions under control of the computer 125. An item that is placed upon the bed of rollers 120 and in contact with at least the roller element 220 can be moved in various directions so as to allow items to be moved in various directions upon the bed of rollers 120.

In an example scenario that is illustrated in FIG. 2, a package loading procedure such as the one described above may be used for placing various packages upon the bed of rollers 120. As a first step in this example procedure, a movement path 260 may be defined for moving each package from the exterior-facing door 105 to a package storage space that includes various storage locations upon the bed of rollers 120. The movement path 260 may be defined on the basis of various criteria such as, for example, on the basis of the largest package that is to be loaded into the delivery vehicle 130 (in this example, a package 210), a shape of a package (for example, a shape of the package 235 or a package 245), and/or the storage location for the various packages. The shape of the movement path 260 in this example, is rectangular. However, the shape of the movement path 260 can be different in other scenarios. The movement path 260 may be also defined on the basis of a package placement configuration that precludes placement of any package on a set of rollers in the bed of rollers 120. The set of rollers are used for moving packages along the first movement path and it is desirable to prevent hindering a movement of a package on the first movement path from one location to another. Keeping the movement path clear is particularly beneficial when each package of a set of packages has to be moved from the exterior-facing door 105 to respective storage locations in the cargo area of the vehicle 130 and/or when re-positioning a package from one storage location to another storage location when the vehicle 130 is moving.

The storage location for each package upon the bed of rollers 120 may be determined next on the basis of various factors such as, for example, size, shape, weight, volume, delivery address, and delivery schedule. In a first example situation, larger packages may be placed farther from the exterior-facing door 105 than smaller packages. In a second example situation, heavier packages may be placed closer to the exterior-facing door 105 in comparison to lighter packages. In a third example situation, packages may be arranged in order of a delivery schedule. The delivery schedule may be based on various factors including, for example, delivery priorities (express delivery, regular delivery, overnight delivery, etc.). In the illustrated example, a package 205 is next in line for delivery, followed by a package 240, and these two packages are therefore placed close to the exterior-facing door 105.

In a fourth example situation, a weighting scheme may be applied to the packages. Accordingly, a higher weighting may be applied to an express delivery package in comparison to a regular delivery package. The weighting scheme, which may use a numerical format such as, for example, 8 out of 10 for a first package and 2 out of 10 for a second package, may be applied not only on the basis of delivery priorities but may be applied on the basis of any of various other factors as well, such as, for example, a heavier package may be assigned a higher weighting than a lighter package, a bulkier package may be assigned a higher weighting than a lighter package (or vice-versa), and an unboxed package may be assigned a higher weighting than a boxed package (or vice-versa).

Figure 3:
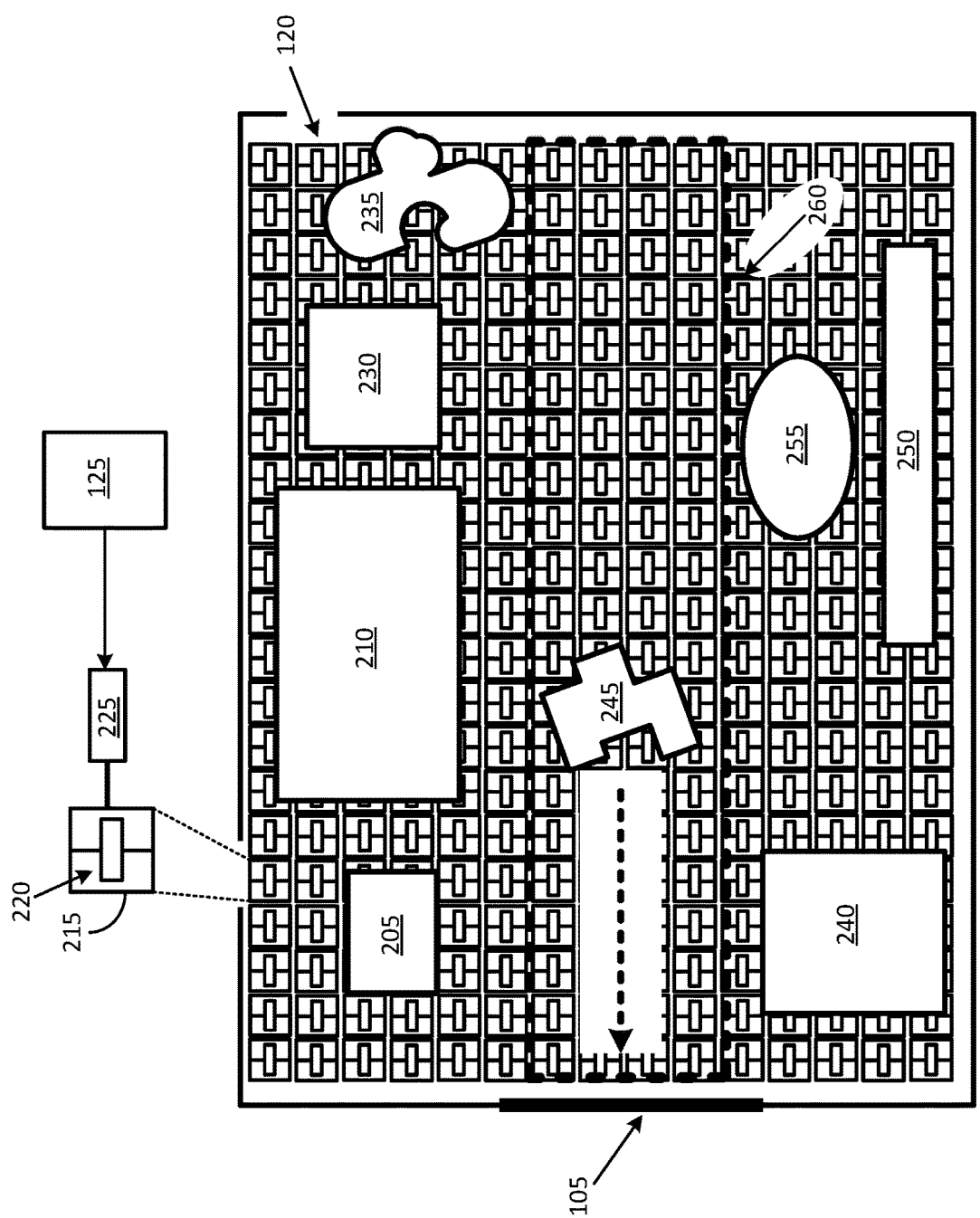
FIG. 3 shows a first example package handling scenario in accordance with the disclosure.

FIG. 3 shows a first example package handling scenario in accordance with the disclosure. The package handling scenario relates to a package delivery procedure for unloading a package from the delivery vehicle 130 at a package delivery destination. In this example scenario, the computer 125 may cooperate with a GPS device in the delivery vehicle 130 to determine that the delivery vehicle 130 has arrived at the package delivery location. The computer 125 then identifies a location of the package 245 upon the bed of rollers 120 by using the camera 140. After identifying the location of the package 245, the computer 125 provides control signals to a set of rollers in the bed of rollers 120 to move the package 245 to an unloading location adjacent to the exterior-facing door 105, via the movement path 260. A package pickup procedure for loading a package into the delivery vehicle 130 may include a loading procedure as described above. The package to be picked up may be deposited close to the exterior-facing door 105 and moved by the computer 125 on the bed of rollers 120 along the movement path 260, to a storage location inside the cargo area 135 of the delivery vehicle 130.

Figure 4:
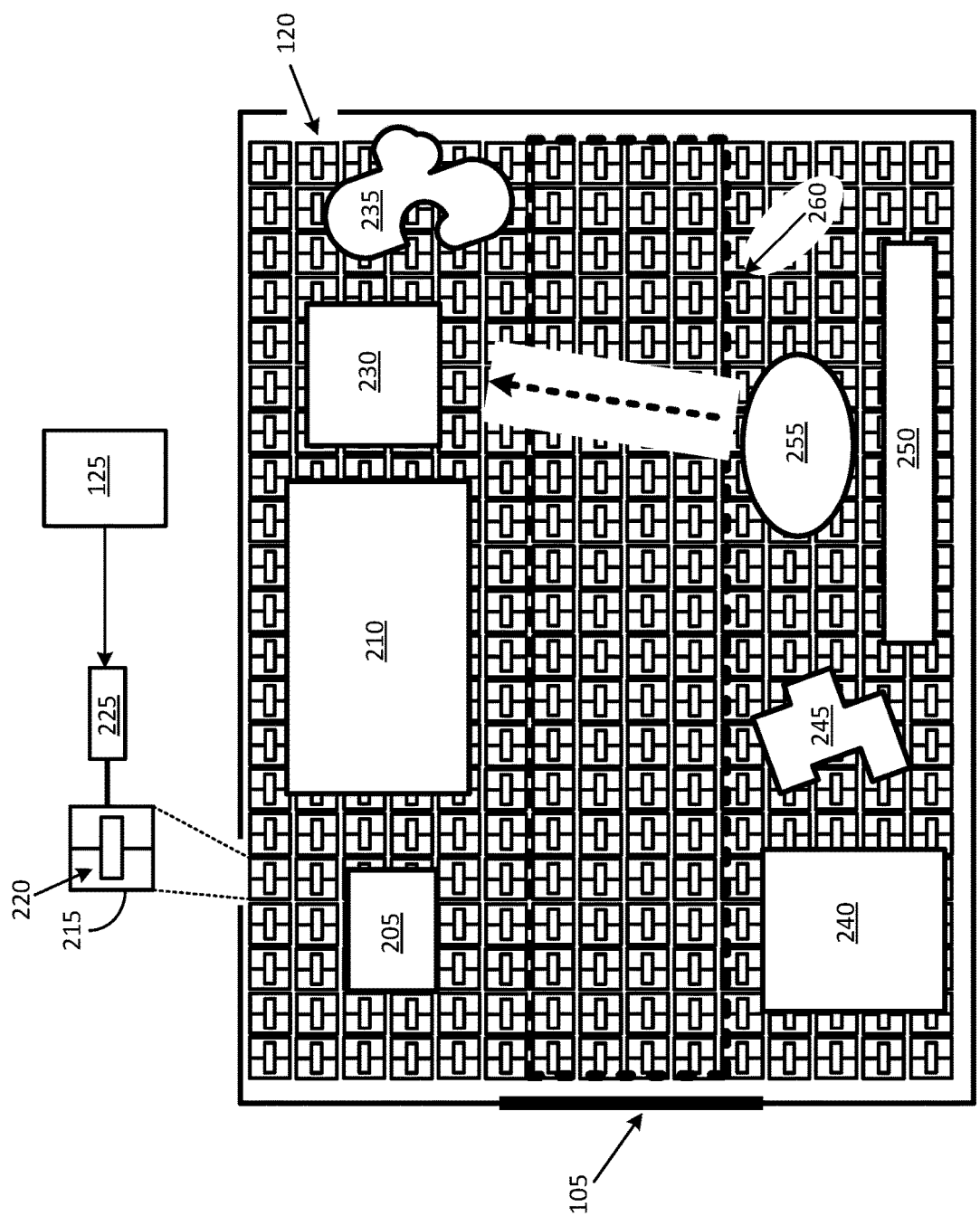
FIG. 4 shows a second example package handling scenario in accordance with the disclosure.

FIG. 4 shows a second example package handling scenario in accordance with the disclosure. The package handling scenario relates to relocating a package 255 in the cargo area 135 of the delivery vehicle 130 when the delivery vehicle 130 is in transit. The relocation may be carried out due to various reasons such as, for example, a change in a package delivery route or a change in a package delivery schedule that affects delivery of another package 250, or movement of packages as a result of movement and motion of the vehicle when in transit. Movement of the package 250 into the movement path 260 is blocked by the package 255. It is therefore desirable to relocate the package 255 before the delivery vehicle 130 arrives at the delivery location for the package 250.

In this example scenario, the computer 125 identifies a location of the package 255 upon the bed of rollers 120 by using the camera 140. After identifying the location of the package 255, the computer 125 provides control signals to a set of rollers in the bed of rollers 120 to move the package 255 across the movement path 260 to a new storage location on the bed of rollers 120, thereby clearing the way for moving of the package 250 into the movement path 260.

Figure 5:
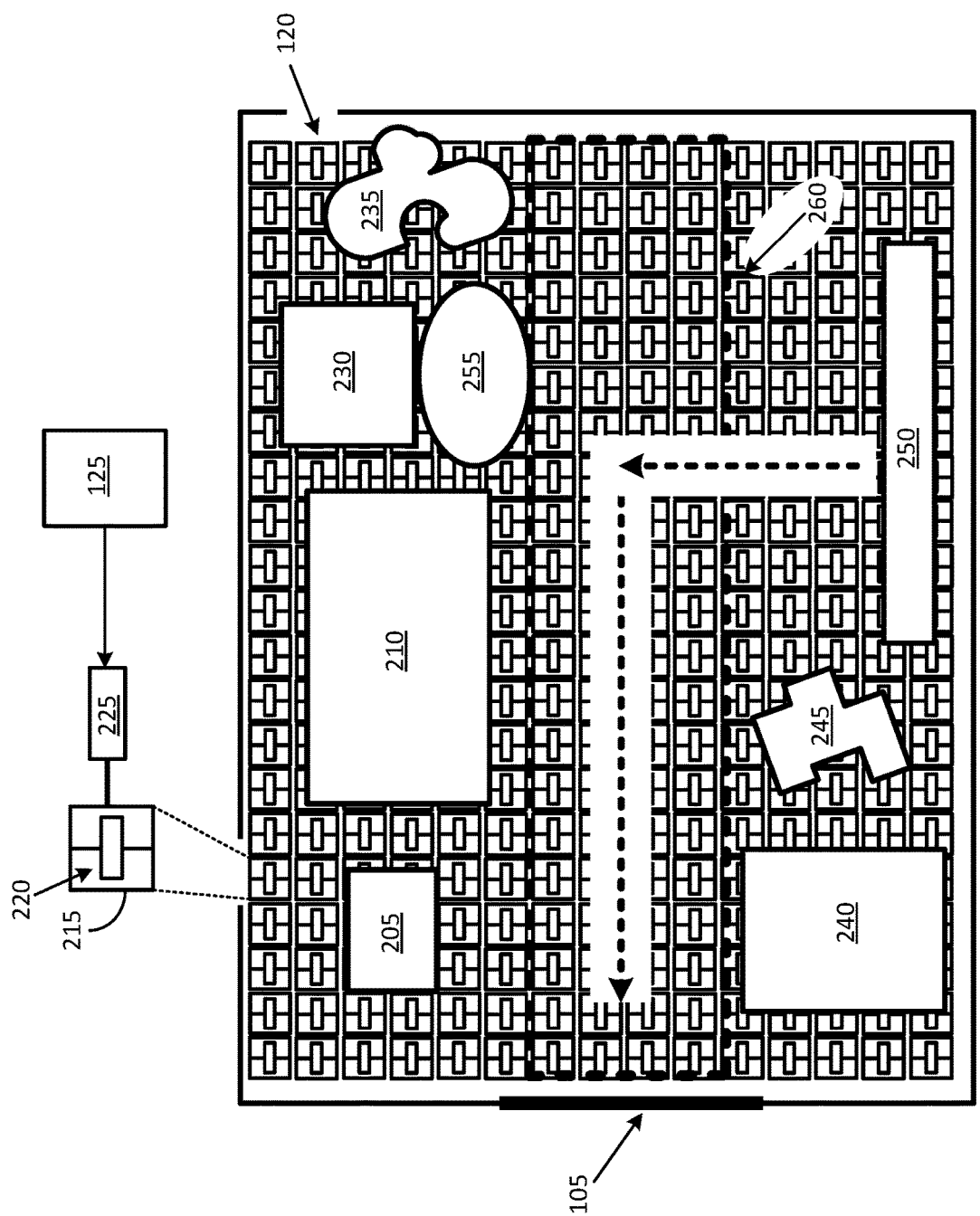
FIG. 5 shows a third example package handling scenario in accordance with the disclosure.

FIG. 5 shows a third example package handling scenario in accordance with the disclosure. The package handling scenario relates to a package delivery procedure for unloading the package 250 (after the package 255 has been relocated in the manner described above). In this example scenario, the computer 125 may cooperate with a GPS device in the delivery vehicle 130 to determine that the delivery vehicle 130 has arrived at the package delivery location. The computer 125 then identifies a location of the package 250 upon the bed of rollers 120 by using the camera 140. After identifying the location of the package 250, the computer 125 provides control signals to a set of rollers in the bed of rollers 120 to move the package 250 into the movement path 260 and to a spot close to the exterior-facing door 105.

Figure 6:
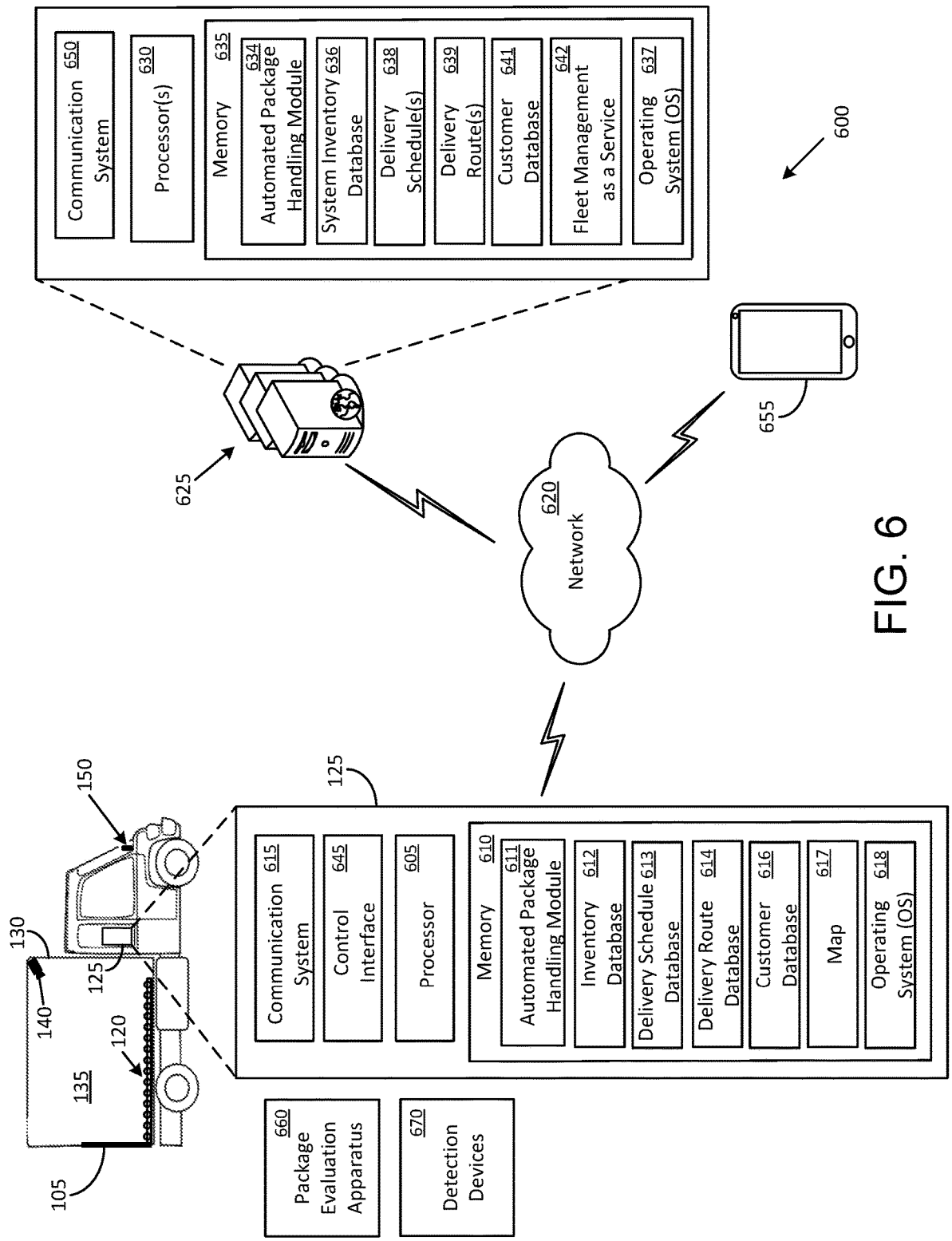
FIG. 6 shows some example components that may be included in an automated package handling system in accordance with the disclosure.

FIG. 6 shows an example network-based implementation of an automated package handling system 600 in accordance with the disclosure. The automated package handling system 600 may include a network 620 that provides communicative coupling between a server system 625, the computer 125, and a personal communications device 655. The personal communications device 655, which can be any of various devices such as, for example, a smartphone, a package scanner, a laptop computer, or a tablet computer, may be carried by an individual such as, for example, a driver of the delivery vehicle 130, a person loading packages into the delivery vehicle 130, a person unloading packages from the delivery vehicle 130, or an operations manager located at any of various locations.

The network 620 can include any one or a combination of a local area network (LAN), a telephone network, a cellular network, a cable network, a wireless network, and/or private/public networks such as the Internet. In some instances, the network 620 may support various wired, wireless, and optical technologies, including Bluetooth, cellular, near-field communication (NFC), Wi-Fi, and/or Wi-Fi direct.

The computer 125 that is provided in the delivery vehicle 130 may include several components such as, for example, a communication system 615, a control interface 645, a processor 605, and a memory 610. The communication system 615 may be configured to allow communications between the computer 125, the server system 625, and the personal communications device 655, via the network 620. The control interface 645 may be configured to transmit control signals to servomotors coupled to various rollers in the bed of rollers 120.

The memory 610, which is one example of a non-transitory computer-readable medium, may be used to store various code modules and various types of data. For example, the memory 610 may be configured to store an automated package handling module 611, an inventory database 612, a delivery schedule database 613, a delivery route database 614, a customer database 616, a map 617 of the cargo area of the delivery vehicle 130, and an operating system (OS) 618.

The automated package handling module 611 may include computer-executable instructions for executing various automated package handling procedures in accordance with the disclosure. In an example procedure, the processor 605 executes the computer-executable instructions stored in the memory 610 to perform operations that include, for example, identifying a location of an item placed upon the bed of rollers 120, activating at least some rollers in the bed of rollers 120 to move the item from a first storage location on the bed of rollers 120 to a spot close to the exterior-facing door 105, or to move the item from a first storage location on the bed of rollers 120 to a second storage location on the bed of rollers 120 while the delivery vehicle 130 is in transit.

The processor 605 may also communicate with a GPS device that can be a part of the navigation system 150 in order to determine a current location of the delivery vehicle 130 along a delivery route that may be identified by using information stored in the delivery route database 614. The processor 605 may then access the delivery schedule database 613 and the customer database 616 to determine, for example, an identity of the package 245 (shown in FIG. 2), followed by accessing the map 617 of the cargo area of the delivery vehicle 130 to identify the location of the package 245 on the bed of rollers 120. The map 617 may be dynamically updated each time one or more items are moved upon the bed of rollers 120 so as to provide accurate and up-to-date location information of the various items placed upon the bed of rollers 120.

After identifying the location of the package 245 on the bed of rollers 120, the processor 605 may use the control interface 645 to transmit control signals to a set of rollers upon which the package 245 is placed so as to move the package 245 close to the exterior-facing door 105. The processor 605 may operate the exterior-facing door 105 after detecting stoppage of the delivery vehicle 130 at the delivery location so as to allow the customer to retrieve the package 245 through the exterior-facing door 105.

A package evaluation apparatus 660 that is communicatively coupled to the computer 125 may be provided near the exterior-facing door 105 (either inside or outside the cargo area 135). A few example components of the package evaluation apparatus 660 may include an optical scanner, a weighing scale, an x-ray system, a radio-frequency identification (RFID) system, a barcode reader, an AprilTag® reader, and a QR code reader. The package evaluation apparatus 660 can be used for determining various characteristics of a package prior to placement of the package in the cargo area 135 of the delivery vehicle 130. For example, an optical scanner may be used to determine a size, shape, and volume of a package. As another example, an RFID system may be used to identify a delivery address of a package.

One or more detection devices 670 may also be provided near the exterior-facing door 105 (either inside or outside the cargo area 135), and may include components such as, for example, weight sensors, optical sensors, and motion sensors that are coupled to the computer 125. For example, a weight sensor may be used to detect a weight of a package and the weight of the package may be communicated to the computer 125. As another example, a motion sensor may be used to detect placement of a package upon the bed of rollers 120, and the information communicated to the computer 125.

The server system 625 may be implemented in the form of a single computer or a networked set of computers that can communicate with the computer 125 in the delivery vehicle 130. In one example implementation, the server system 625 may be a single computer that includes various components such as, for example, a communication system 650, a processor 630, and a memory 635. The communication system 650 may be configured to communicate with the computer 125 and/or the personal communication device 655, through the network 620. The memory 635, which is one more example of a non-transitory computer-readable medium, may be used to store various code modules and various types of data. For example, the memory 635 may be configured to store an automated package handling module 634, a system inventory database 636, one or more delivery schedules 638, one or more delivery routes 639, a customer database 641, a fleet-management-as-a-service (FMasS) 642, and an operating system (OS) 637.

In an example mode of operation, the processor 630 executes the computer-executable instructions stored in the memory 635 to perform some operations in cooperation with the computer 125 provided in the delivery vehicle 130. For example, the processor 630 may use data stored in the memory 635 (such as the system inventory database 636, the delivery schedules 638, the delivery routes 639, and the customer database 641) to populate and/or update the contents of the memory 610 that is a part of the computer 125 provided in the delivery vehicle 130. As another example, the processor 630 may use the FMasS 642 to perform services such as, for example, package space allocation in the delivery vehicle 130, route scheduling, and vehicle dispatch operations.

A memory device such as the memory 610 and the memory 635 shown in FIG. 6 can include any one memory element or a combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory device may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

The personal communications device 655 can contain some of the components provided in the server system 625 such as, for example, the delivery schedules 638 and the delivery routes 639 as applicable to packages associated with the individual who is handing the personal communications device 655 and may also contain modules related to specific package details and specific delivery routes pertaining to packages associated with the individual who is handing the personal communications device 655. In an example scenario, the components may be provided in the form of a software application that is downloadable into the personal communications device 655.

Figure 7A:
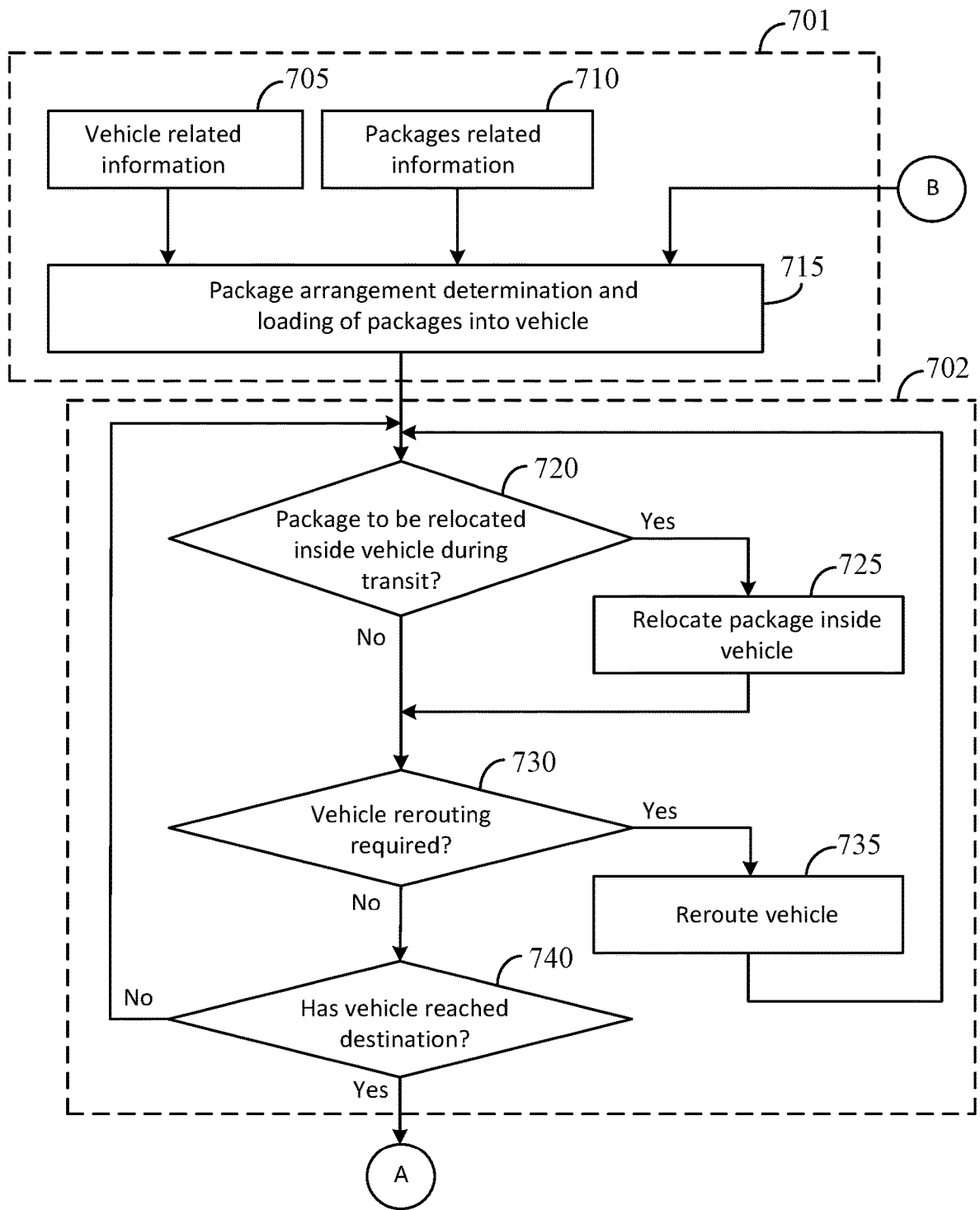
FIGS. 7A and 7B show a flowchart of an example method of operation of an automated package handling system in accordance with the disclosure.
Figure 7B:
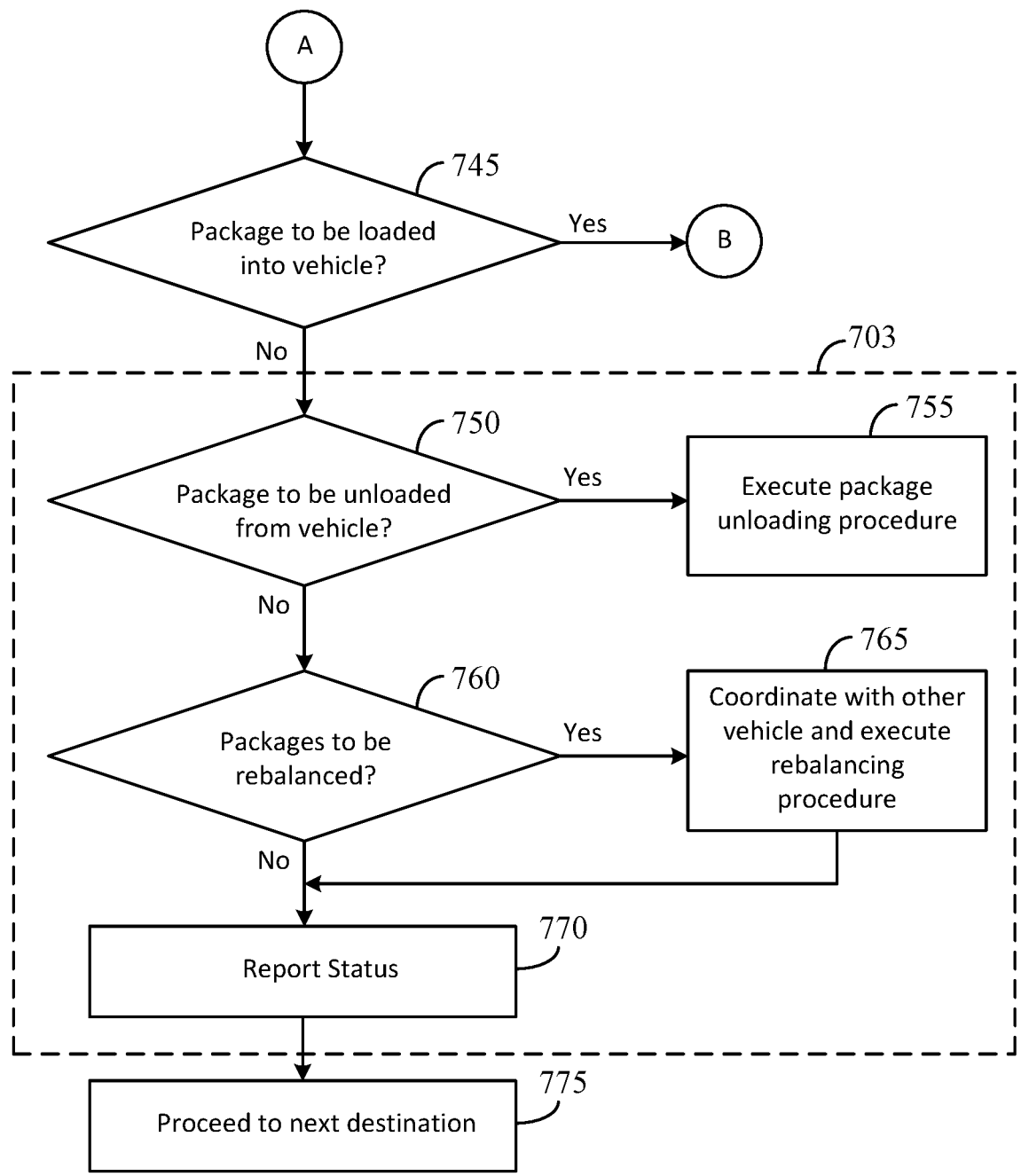

FIGS. 7A and 7B show a flowchart 700 of an example method of operation of the automated package handling system 100 in accordance with the disclosure. The flowchart 700 illustrates a sequence of operations that can be implemented in hardware, software, or a combination thereof. In the context of software, the operations represent computer-executable instructions stored on one or more non-transitory computer-readable media such as the memory 610 and the memory 635, that, when executed by one or more processors such as the processor 605 and the processor 630, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be carried out in a different order, omitted, combined in any order, and/or carried out in parallel. Some or all of the operations described in the flowchart 700 may be carried out by using an application executed on the computer 125 and/or the server system 625.

The flowchart 700 may be broadly categorized into three sections. A first section that is indicated by a dashed line box 701 pertains to an offline space allocation and loading procedure that is carried out in accordance with the disclosure when a delivery vehicle is picking up one or more packages. In general, at this stage of operations, the computer 125 (and/or the server system 625) is provided with all of the information required to load packages into a delivery vehicle prior to the delivery vehicle setting out on a delivery route. The logistics involved in evaluating and loading the various packages may be resolved at this time with less computational time and resource limitations. The offline space allocation and loading procedure is generally directed at optimizing the utilization of the cargo area of a delivery vehicle and minimizing loading and unloading times for packages along with travel time of a delivery vehicle.

The offline space allocation and adjustment procedure may be executed by the computer 125 using various types of algorithms and heuristics. Such algorithms can include, for example, an algorithm used to solve a vehicle routing problem, an algorithm used to solve a bin packing problem, an algorithm used to solve a traveling thief problem, and an algorithm used to solve a sliding block puzzle problem. Such algorithms may be used individually or in combinations of two or more algorithms.

A second section of the flowchart 700 that is indicated by a dashed line box 702 pertains to an online space allocation and adjustment procedure that is carried out in accordance with the disclosure when the delivery vehicle is moving on a delivery route. In general, at this stage of operations, an onboard computer, such as the computer 125, may receive various types of inputs in real time such as, for example, a command to reroute the delivery vehicle for purposes of delivering a package at a different address, delivering a package at a time that is different than a scheduled delivery time, picking up a package at an unscheduled time or place, or for other reasons.

The real time inputs may impose time constraints for carrying out operations such as, for example, when the delivery vehicle is in motion and prior to the delivery vehicle reaching a delivery destination. In some cases, responding to a command to reroute the delivery vehicle may entail the computer 125 executing a package relocation procedure (such as those described above with respect to FIG. 4 and FIG. 5) while the delivery vehicle is in motion.

The online space allocation and adjustment procedure may be executed by the computer 125 using various types of algorithms and heuristics that address such time constraints and is generally directed at providing flexibility during package delivery. A few examples of such algorithms can include an algorithm used to solve a vehicle routing problem, an algorithm used to solve a bin packing problem, an algorithm used to solve a traveling thief problem, an algorithm used to solve a sliding block puzzle problem, an algorithm for dynamic routing based on real time traffic information, an algorithm for rerouting a delivery vehicle based on simultaneous package delivery and package pickup, and an algorithm for resolving a vehicle routing problem based on the use of drones, ride-sharing, and ad-hoc demand requests. Such algorithms may be used individually or in combinations of two or more algorithms.

A third section of the flowchart 700 that is indicated by a dashed line box 703 pertains to an online unloading procedure carried out in accordance with the disclosure when the delivery vehicle is stationary for purposes of unloading one or more packages. The online unloading procedure is generally directed at providing flexibility in terms of operations such as, for example, an unscheduled package pickup and for rebalancing packages between delivery vehicles. The online unloading procedure may be executed by the computer 125 using various types of algorithms and heuristics. Such algorithms can include, for example, an algorithm used to solve a bin packing problem, and an algorithm used to solve a sliding block puzzle problem. These algorithms may be used individually or in combinations of two or more.

At block 705, a computer obtains information about each of various delivery vehicles, such as, for example, a type of vehicle and physical characteristics of a cargo area of the vehicle. The cargo area of a delivery vehicle may be configured to accept one or more packages for delivery. The configuration operation, which can include defining a movement path on a bed of rollers in the cargo area, may be carried out, for example, at a warehouse where packages of various sizes may be stored for pickup by the delivery vehicle prior to the delivery vehicle setting out on a delivery route.

At block 710, a computer obtains information about each of the various packages, such as, for example, a delivery address and physical characteristics of a package. Physical characteristics of the package such as, for example, a weight, a volume, a footprint, and/or a shape of the package, may be detected as described above by using one or more detection devices such as weight sensors, optical sensors, and scanners.

At block 715, an arrangement for the placement of various packages in the cargo area of the delivery vehicle may be carried out. In an example implementation, the placement may be carried out by using a package evaluation apparatus (such as the package evaluation apparatus 660 described above) in cooperation with the computer 125. The placement can include execution of a space allocation and loading procedure by the computer 125, based on vehicle information (type of vehicle, cargo space information, etc.), and package information (dimensions and shapes of various packages, number of packages, etc.).

The space allocation and loading procedure may be implemented by employing methods that involve solving problems such as, for example, a vehicle routing problem, a bin packing problem, a sliding block puzzle problem, a knapsack problem, and/or a traveling thief problem. Solutions based on a vehicle routing problem may involve minimizing routing costs based on pick-up, delivery, and time windows. Solutions based on a bin packing problem may involve maximizing space utilization based on limitations of the cargo area and overlapping constraints such as the physical characteristics of various packages. The traveling thief problem may involve using a combinational approach that takes into consideration solutions related to both the vehicle routing problem and the bin packing problem. Solutions based on the sliding block puzzle problem may involve defining the movement of various packages when the delivery vehicle is in transit.

At block 720 a determination may be made whether a package has to be relocated in the cargo area of the delivery vehicle when the delivery vehicle is in transit. In one case, relocation of a package may be required because of reasons such as, for example, a change in a delivery route or a change in a delivery schedule, which affects delivery of the package.

Consequently, at block 725, the package may be relocated in the cargo area (for example, in the manner described above with reference to FIG. 4) while the delivery vehicle is moving on a delivery route. The relocation procedure may be implemented by employing methods that involve solving problems such as, for example, a vehicle routing problem, a bin packing problem, a sliding block puzzle problem, and/or a traveling thief problem. Factors such as, for example, a trip time to a package delivery destination, may place time constraints on executing the relocation procedure in real time. Such time constraints may not be applicable when the delivery vehicle has not yet started on the delivery route, such as when executing the offline space allocation and loading procedure described above.

If no relocation is required, at block 730, a determination may be made whether a rerouting of the delivery vehicle is required. In one case, a rerouting may be required due to reasons such as, for example, a change in a delivery route or a change in a delivery schedule. If rerouting is required, at block 735, the delivery vehicle is re-routed, followed by operations indicated in block 720 and subsequent blocks.

If rerouting is not required, at block 740, a determination is made whether the delivery vehicle has reached a package delivery location. If the delivery vehicle has not yet reached a package delivery location, operations indicated in block 720 and subsequent blocks are carried out. If the delivery vehicle has reached a package delivery location, at block 745, a determination is made whether a package is to be loaded into the delivery vehicle. Such an event may occur due to various factors such as, for example, due to a communication received by the computer 125 of an unscheduled package pickup. If a package is to be picked up, the operations indicated in block 715 and subsequent blocks are carried out.

If no package pickup is to take place, at block 750, a determination is made whether a package is to be unloaded from the delivery vehicle. If a package is to be unloaded, at block 755, the package may be unloaded from the delivery vehicle using an unloading procedure such as, for example, in the manner described above with reference to FIG. 5.

If no packages are to be unloaded, at block 760, a determination is made whether a package rebalancing operation is to be carried out. Package rebalancing may be driven by various factors such as, for example, due to a load capacity of the delivery vehicle being exceeded, due to an availability of package space in the delivery vehicle for additional packages, due to a delivery route being changed, or due to a delivery time being changed. If rebalancing is required, at block 765, the delivery vehicle may rendezvous with another vehicle and one or more packages may be transferred between the two vehicles. The computer in the delivery vehicle may communicate with a computer in the other vehicle to arrange the rendezvous and execute the rebalancing procedure.

If no package rebalancing operation, at block 770, the computer in the delivery vehicle may report a current status of the package delivery operation to a computer in a head office, for example, followed by block 775 where the delivery vehicle proceeds to the next destination for package delivery or pickup.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," "an example implementation" etc., indicate that the embodiment or implementation described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and system memory, as discussed herein.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including in-dash vehicle computers, personal computers, desktop computers, laptop computers, message processors, mobile devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method comprising:
    receiving, by a computer in a vehicle that is traveling on a package delivery route, a command related to a delivery of a first package;
    determining, by the computer, a time constraint associated with the delivery of the first package, wherein the time constraint is based on a trip time to a delivery destination for the first package;
    operating, by the computer, responsive to the command and based on the time constraint, an unmanned package moving apparatus to move the first package from a first location in a cargo area of the vehicle to a second location in the cargo area while the vehicle is in motion and prior to the vehicle reaching the delivery destination for the first package, wherein the unmanned package moving apparatus comprises a bed of rollers operated by one or more servomotors under control of the computer;
determining, by the computer, an arrival of the vehicle at a pickup location for a second package;
determining, by the computer, a first physical characteristic of the second package;
determining, by the computer, based on the command and the first physical characteristic of the second package, a third location in the cargo area of the vehicle;
determining, by the computer, a first movement path for the second package upon the bed of rollers, the first movement path extending between a door of the vehicle and the third location; and
activating, by the computer, a first set of rollers in the bed of rollers, to automatically move the second package along the first movement path from the door of the vehicle to the third location.

2. The method of claim 1, wherein the command comprises a rerouting of the vehicle due to a change in a delivery schedule and/or a delivery priority.

3. The method of claim 2, wherein moving the first package from the first location in the cargo area to the second location in the cargo area comprises:
identifying, by the computer, based on the command, the second location in the cargo area of the vehicle as one of a second storage location in the cargo area of the vehicle or an unloading location adjacent to the door of the vehicle;
determining, by the computer, a second movement path for the first package upon the bed of rollers, the second movement path extending between the first location and the one of the second storage location in the cargo area of the vehicle or the unloading location adjacent to the door of the vehicle; and
activating, by the computer, a second set of rollers in the bed of rollers, to automatically move the first package along the second movement path from the first location to the one of the second storage location in the cargo area of the vehicle or the unloading location adjacent to the door of the vehicle.

4. The method of claim 3, wherein identifying, by the computer, based on the command, the second storage location for the first package is further based on executing an algorithm to resolve a knapsack problem, a bin packing problem, and/or a traveling thief problem.

5. The method of claim 1, further comprising:
identifying, by the computer, the third location for the second package based on executing an algorithm to resolve a knapsack problem, a bin packing problem, and/or a traveling thief problem.

6. A method comprising:
identifying, by a computer, in a bed of rollers operated by one or more servomotors under control of the computer and provided in a cargo area of a vehicle, a first set of rollers that are activatable to move packages along a first movement path extending between a door of the vehicle and a package storage space in the cargo area;
identifying, by the computer, a package placement configuration for a set of packages based on a delivery address for each package in the set of packages, a delivery route of the vehicle for delivering the set of packages, and/or precluding placement of any of the set of packages on the first movement path;
determining, by the computer, a time constraint associated with delivering the set of packages, wherein the time constraint is based on a trip time to one or more delivery destinations for the set of packages;
operating, by the computer, based on the time constraint, the first set of rollers to move the set of packages into a set of storage locations in the cargo area in conformance with the package placement configuration;
identifying, by the computer, a first physical characteristic of a first package in the set of packages;
identifying, by the computer, based on at least one of the first physical characteristic of the first package and the delivery route of the vehicle for delivering the set of packages, a first storage location for the first package in the package storage space in the cargo area;
activating, by the computer, the first set of rollers to automatically move the first package from a door of the vehicle to the first storage location along the first movement path;
receiving, by the computer, a notification of one of a change of a first delivery address for the first package, a change of a delivery priority of the first package, or a change in a delivery route of the vehicle; and
activating, by the computer, responsive to the notification, while the vehicle is moving, the first set of rollers to automatically move the first package along the first movement path from the first storage location to an unloading location adjacent to the door of the vehicle.

7. The method of claim 6, wherein identifying the package placement configuration is additionally based on a physical characteristic of each package in the set of packages.

8. The method of claim 6, further comprising:
activating, by the computer, while the vehicle is moving, a second set of rollers in the bed of rollers to automatically move the first package in the set of packages along a second movement path extending between a first location in the package storage space in the cargo area to a second location in the package storage space.

9. The method of claim 6, further comprising:
identifying, by the computer, a second physical characteristic of a second package in the set of packages;
identifying, by the computer, based on the first physical characteristic of the first package and the second physical characteristic of the second package, a second storage location for the second package in the package storage space, wherein identifying the second storage location for the second package comprises resolving a bin packing problem associated with the first storage location and the second storage location in the package storage space of the vehicle and/or a sliding block puzzle problem associated with moving the first package and/or the second package on the bed of rollers.

10. The method of claim 9, wherein identifying, by the computer, the second storage location for the second package further comprises resolving a knapsack problem associated with the package storage space of the vehicle, a bin packing problem associated with the package storage space, and/or a traveling thief problem associated with the package storage space and the delivery route of the vehicle.

11. A vehicle comprising:
an unmanned package moving apparatus, comprising a bed of rollers operated by one or more servomotors, provided in a cargo area of the vehicle; and a computer comprising:
   a memory that stores computer-executable instructions; and
   a processor configured to access the memory and execute the computer-executable instructions to perform operations comprising:
      receiving a command related to a delivery of a first package;
      determining a time constraint associated with the delivery of the first package, wherein the time constraint is based on a trip time to a delivery destination for the first package;
      operating, responsive to the command and based on the time constraint, the unmanned package moving apparatus to move the first package from a first location in the cargo area of the vehicle to a second location in the cargo area while the vehicle is in motion and prior to the vehicle reaching the delivery destination for the first package;
      determining an arrival of the vehicle at a pickup location for a second package;
      determining a physical characteristic of the second package;
      determining, based on the command and the physical characteristic of the second package, a third location in the cargo area of the vehicle;
      determining a first movement path for the second package upon the bed of rollers, the first movement path extending between a door of the vehicle and the third location; and
      activating a first set of rollers in the bed of rollers to automatically move the second package along the first movement path from the door of the vehicle to the third location.

12. The vehicle of claim 11, wherein moving the first package from the first location in the cargo area to the second location in the cargo area comprises:
   identifying, by the processor, based on the command, the second location in the cargo area of the vehicle as one of a second storage location in the cargo area of the vehicle or an unloading location adjacent to the door of the vehicle;
   determining, by the processor, a second movement path for the first package upon the bed of rollers, the first movement path extending between the first location and the one of the second storage location in the cargo area of the vehicle or the unloading location adjacent to the door of the vehicle; and
   activating, by the processor, a second set of rollers in the bed of rollers, to automatically move the first package along the first movement path from the first location to the one of the second storage location in the cargo area of the vehicle or the unloading location adjacent to the door of the vehicle.

13. The vehicle of claim 12, wherein identifying, based on the command, the second storage location in the cargo area is further based on the processor executing an algorithm to resolve a knapsack problem, a bin packing problem, and/or a traveling thief problem.

14. The vehicle of claim 11, wherein the processor is further configured to access the memory and execute additional computer-executable instructions to perform operations comprising:
   identifying the third location for the second package based on executing an algorithm to resolve a knapsack problem, a bin packing problem, and/or a traveling thief problem.

\* \* \* \* \*